(12) United States Patent
Van der Heijden

(10) Patent No.: US 7,003,923 B2
(45) Date of Patent: Feb. 28, 2006

(54) DEVICE FOR CONNECTING TO EACH OTHER THREE FLAT ELEMENTS

(76) Inventor: Franciscus Antonius Maria Van der Heijden, Grotenhout 2, B-2275, Lille (BE)

( * ) Notice: Subject to any disclaimer, the term of this patent is extended or adjusted under 35 U.S.C. 154(b) by 164 days.

(21) Appl. No.: 10/432,082

(22) PCT Filed: Nov. 8, 2001

(86) PCT No.: PCT/EP01/13085

§ 371 (c)(1),
(2), (4) Date: Sep. 16, 2003

(87) PCT Pub. No.: WO02/40808

PCT Pub. Date: May 23, 2002

(65) Prior Publication Data

US 2004/0045254 A1    Mar. 11, 2004

(30) Foreign Application Priority Data

Nov. 20, 2000  (NL) ..................................... 1016658

(51) Int. Cl.
*E04F 13/08* (2006.01)
(52) U.S. Cl. ........................ 52/391; 52/127.2; 52/582.2

(58) Field of Classification Search ............ 52/DIG. 1, 52/390, 127.2, 127.5, 127.7, 391, 582.2
See application file for complete search history.

(56) References Cited

U.S. PATENT DOCUMENTS 5,481,841 A * 1/1996 Osborn ....................... 52/311.2

* cited by examiner

*Primary Examiner*—Naoko Slack
(74) *Attorney, Agent, or Firm*—Hartman & Hartman; Gary M. Hartman; Domenica N. S. Hartman

(57) ABSTRACT

A device for connecting together flat elements that are lying in a plane with at least one edge of a first of the flat elements adjacent at least one edge of each of second and third flat elements. The device is connected to the first flat element and comprises at least two hook-shaped organs, a first of which cooperates with a first contact on the second flat element and a second of which cooperates with a second contact on the third flat element. Each of the first and second hook-shaped organs is movable between a first position in which the flat elements are released from each other, and a second position in which the first and second hook-shaped organs engage the first and second contacts to cause edges of the first flat element to be pressed against edges of the second and third flat elements.

9 Claims, 3 Drawing Sheets

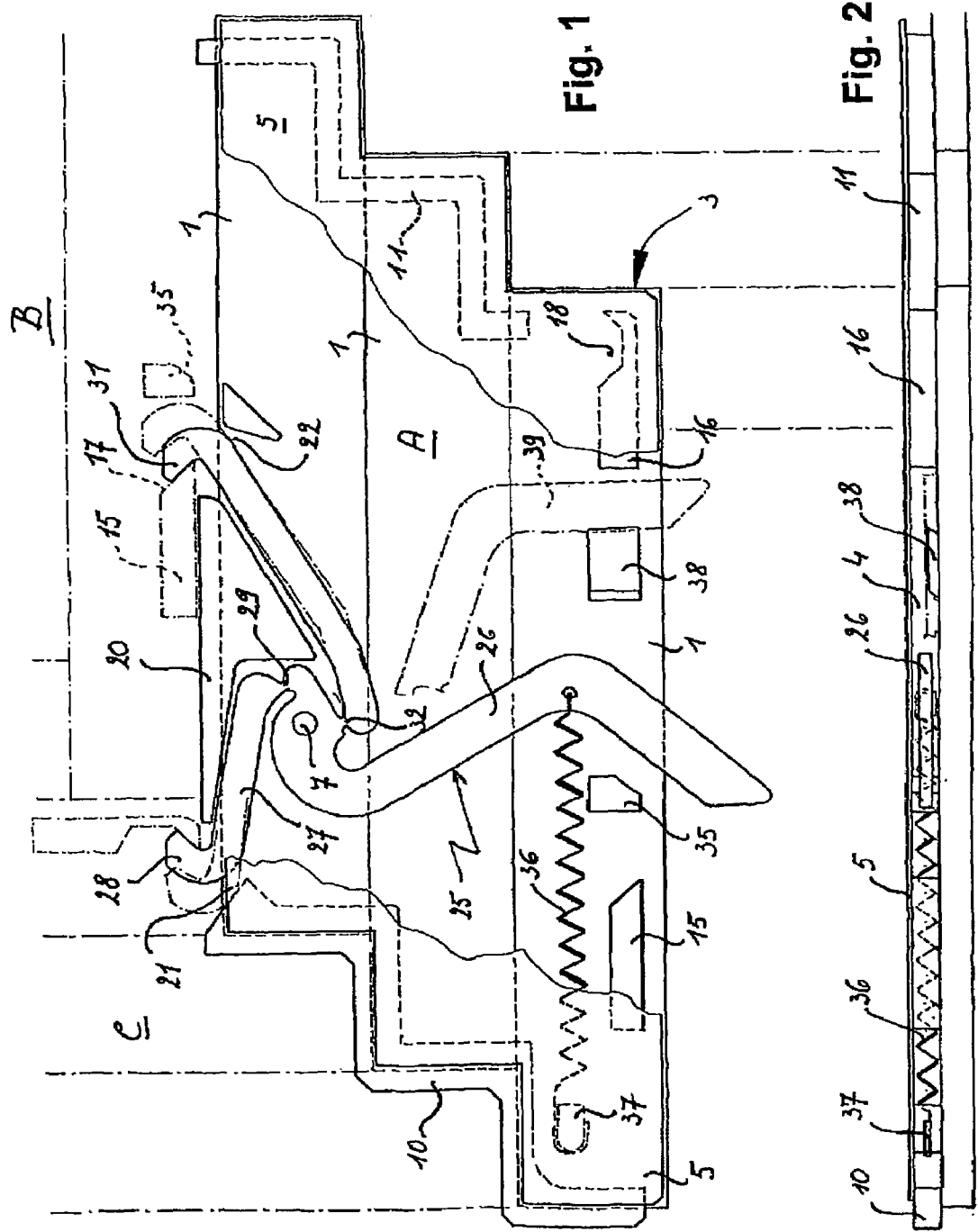

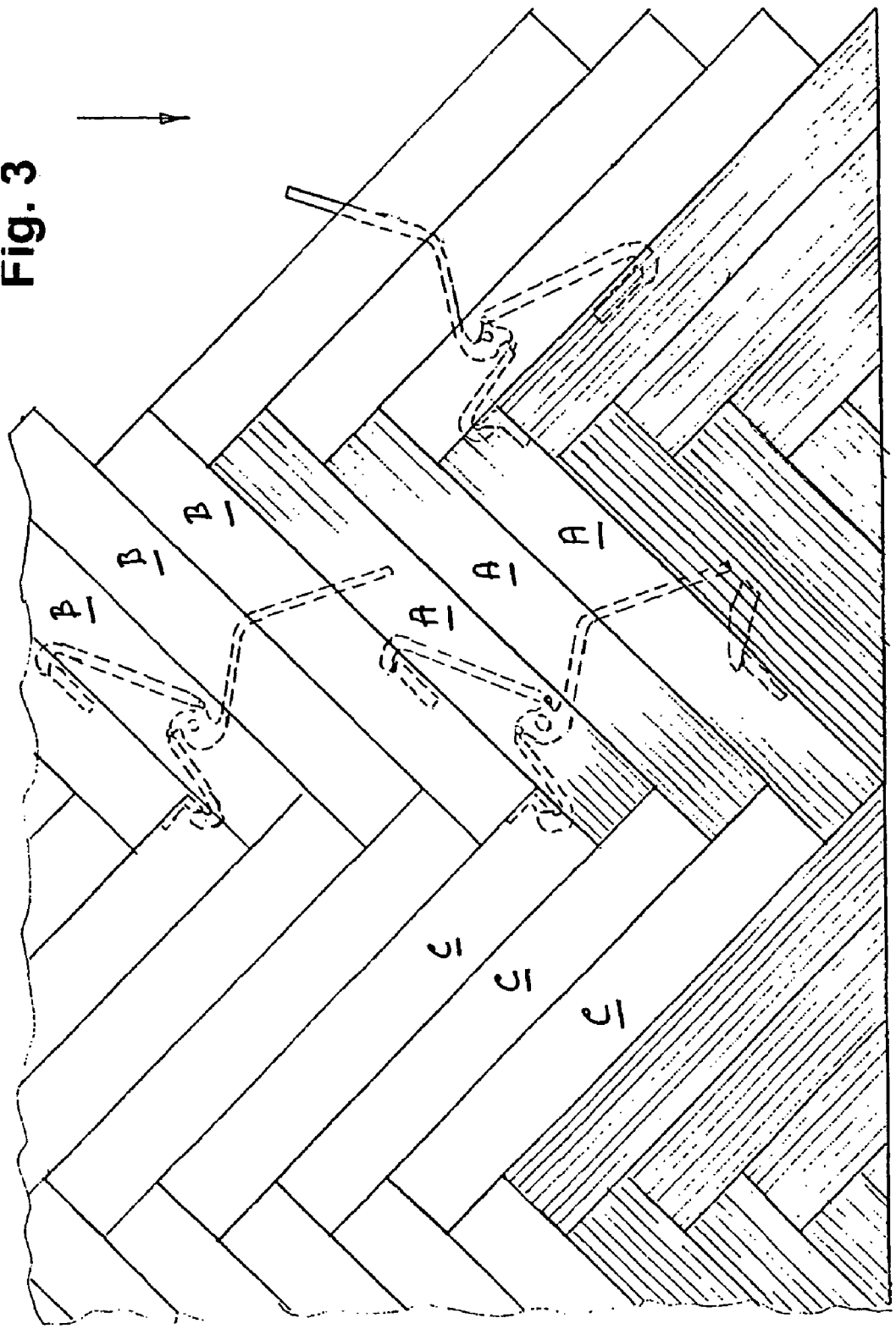

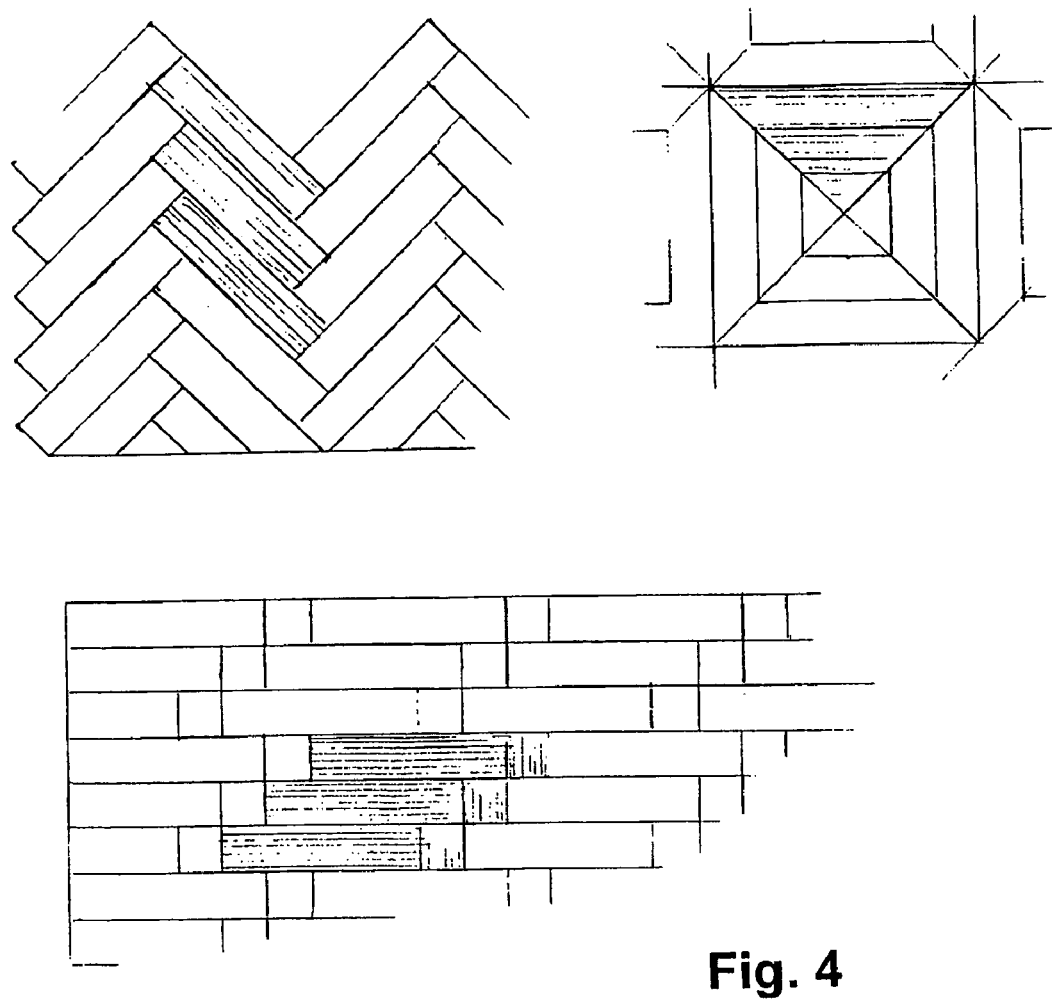
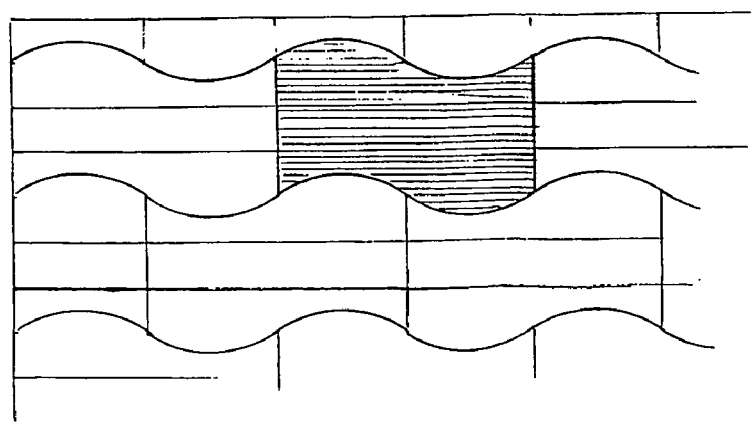
Fig. 4

DEVICE FOR CONNECTING TO EACH OTHER THREE FLAT ELEMENTS

CROSS REFERENCE TO RELATED APPLICATIONS

This application claims the benefit of International Application No. PCT/EPO1/13085 filed November 2001, having a priority claim to Netherlands patent application number 1016658 filed Nov. 20, 2000.

BACKGROUND OF THE INVENTION (1) Field of the Invention

The present invention relates to a device for connecting each other three flat elements, lying on one single plane and connecting each with at least one edge against at least one edge of each of two other elements.

(2) Description of the Related Art

Connecting each other flat elements is a problem occurring regularly in practice and so-called parquet floorings are one known example.

Usually, parquet floorings are secured through nails or glues to an under floor and consequently ensure the adhesion between the various elements. This is generally a permanent link between the parquet flooring and the underfloor which can only be undone when damaged.

In practice, it is often desired to fit such parquet floors in such a way that they can be simply dismantled and fitted again in another place. This is particularly important when moving.

Moreover, it may also be required to discard some parts of the parquet flooring and to replace them with new elements, for example, when some parts are damaged or are extremely worn.

BRIEF SUMMARY OF THE INVENTION

The object of the present invention is therefore to provide a device of the type mentioned in the opening paragraph, making it possible not only to connect each other flat elements in a simple way, but making it also possible to disassemble the resulting connection easily and with no damage.

This object is achieved according to the invention in that the device is connected with a first flat element and is provided with at least two hook-shaped organs, wherein one hook-shaped organ cooperates with a snap-on contact connected with the second flat element and the second hook-shaped organ cooperates with a snap-on contact connected with the third flat element and wherein the hook-shaped organs are movable between a first position, where the flat elements are released from each other, and a second position where the elements are pressed against each other with their common edges.

BRIEF DESCRIPTION OF THE DRAWINGS

Other features and advantages of the device according to the invention will become apparent from the following description of an embodiment referring to the accompanying drawings, in which:

FIG. 1 is a bottom view showing some elements of a parquet flooring provided with a device according to the invention, FIG. 2 is side view of FIG. 1, FIG. 3 is a top view showing a parquet flooring in a herringbone pattern with a schematic illustration of the connection, and FIG. 4 is a top view illustrating some parquet flooring patterns which can be fitted using the device according to the invention.

DETAILED DESCRIPTION OF THE INVENTION

In FIG. 1, part of a parquet flooring is illustrated as a bottom view, where the parquet flooring parts are assembled with each other by means of a device according to the invention. As usual with parquet floorings, it comprises a number of rectangular parquet pieces 1 which, in the illustrated embodiment, are connected with each other as a herringbone structure. In the illustrated embodiment, respectively three parquet pieces 1 are already assembled into a parquet part 3, so that respectively such parquet parts 3 make up a whole and are able to be used and fitted as such. The assembly and the mutual connection of the three parquet pieces 1 into a parquet part 3 are done by means of a connecting element 4 which is secured against the bottom part of the three parquet pieces 1 and thereby hold them together. This securing operation can be done with glue, screws, nails, staples or any other means, and can be performed at the industrial scale using the appropriate devices so that a uniform product is produced in the form of parquet parts 3.

The connecting element 4 comprises a plate-shaped part 5 which can extend over nearly the entire surface of the three parquet pieces 1 to be connected together, having thereby a uniform shape. This plate-shaped part 5 is preferably somewhat smaller than a parquet part 3 so that it does not hinder assembling two parquet parts 3. In FIG. 1, the plate-shaped element 5 is partially not shown.

Between the plate-shaped part 5 and the parquet pieces 1, is located a number of spacers arranged so as to create a flat space where the parquet part 3 connecting mechanism can be received.

The spacers comprise a first stairs-shaped spacer 10 that follows a stairs-shaped edge of the parquet part 3 and thereby projects somewhat from this edge and a second stairs-shaped spacer 11 that follows the other stairs-shaped edge of the parquet part 3 and thereby lies somewhat inwardly relative to this edge.

This projection, respectively inwardly localisation results, upon fitting, in some overlap between neighbouring parquet parts 3, so that the level remains the same.

The spacers additionally comprise two straight elements 15 and 16, that project along one of the straight edges of the parquet part 3.

The element 15 consequently has a beveled edge 17 and the element 16 has a trapezoid recess 18. Along the other straight edge of the parquet part 3, a spacer 20 is arranged forming two side openings 21 and 22, the function of which will be described hereinafter.

The whole plate-shaped part 5 and spacers 10, 11, 15, 16 and 20 are shaped in such a way that the spacers can be selectively arranged according to the structure shown in FIG. 1 or as a mirror image thereof.

In the space formed by the parquet pieces 1, the plate-shaped plate 5 and the spacers 10, 11, 15, 16 and 20, a connecting mechanism 25 is arranged, by means of which two parquet parts 3 arranged one against another can be connected together.

In the illustrated embodiment, the connecting mechanism is made with a knee-shaped lever 26 which is able to rotate about a pivot 7 being arranged between the parquet part 3 and the plate-shaped part 5. An arm 27 is provided at its free end with a hook 28 projecting through the opening 21 and is connected, by means of a hinge 29, with the lever. A second arm 30 is provided at its free end with a hook 31 projecting through the opening 22 and is connected, by means of a hinge 32, with the lever 26. The hinges 29 and 32 are built in the illustrated embodiment as so-called film hinges, which kinetically move with the arm 26.

The lever 26 is in principle movable between the spacers 16 and 35 and partially projects out of the parquet part surface 3.

A draw-spring 36 is arranged between a spacer 37 and the lever 26 and draws the lever 26 in the direction of a spacer 35. Against the parquet part 3, but at some distance from the plate-shaped part 5, a strip 38 is provided, which together with the spacer 16 forms a space 39 in which the lever 26 can be attached in a position. In this respect, the strip 38 can be provided with an oblique side for receiving the lever 26.

The operation of the device according to the invention is as follows:

As illustrated in FIG. 3, these parquet parts A, B and C are placed one against another, in such a way that the parquet part B forms an extension of the parquet part A at one side of the herringbone pattern. Both parquet parts A and B are therefore identical. A third parquet part C forms the other half of the herringbone pattern and is identical by nature to parquet parts A and B in that the spacers are placed in a mirror image way relative to the spacers in parquet parts A and B.

The lever 26 belonging to the parquet part A lies in a first position, as indicated in dotted lines in FIG. 1. It is hold therein by the oblique edge of the element 38, in spite of the force of the spring 36.

After the three parquet parts A, B and C are arranged as indicated in FIG. 1, the lever 26 is operated by a pressure exerted on the projecting part of lever 26, thereafter the spring 36 moves the lever 26 towards a second position, illustrated in a plain line in FIG. 1. Thereby the arms 27 and 30 are moved as well, and depending on the way both arms 27 and 30 are connected with the arm 26, the hook 28 is engaged on the tilted surface of the trapezoid recess 18 of the parquet part C and the hook 31 on the beveled edge 17 of the parquet part B. Thereby, the parquet part C is pressed in the direction of parquet parts A and B and the parquet part B in the direction of parquet parts A and C. Thereby, a strong connection is created with sufficient side compression between the parquet parts A, B and C. The side compression between A, B and C remains because of the spring force, even if the parquet should shrink or expand in the course of time. The compression between parts B and C is the direct consequence of the lever mechanism kinematics consisting of the lever 26 and the arms 27 and 30. The compression between parts A and B, respectively parts A and C, is on the one hand the consequence of the lever mechanism kinematics, but on the other hand, it can be still enhanced by the slides in the hooks 28, 31 and the slides of the spacers 18 and 15, creating thereby an additional compression.

It is obviously possible, upon fitting the parquet parts, to maintain the lever 26 manually and when the three parts A, B and C are accurately positioned relative to each other, the lever 26 can be locked manually in the second position mechanically.

However, spring 36 is preferably used, so that the mutual compression of A, B and C should be constant.

Different other parquet part configurations are illustrated in FIG. 4, which can be arranged by means of the connecting element according to the invention. Thereby, depending on the selected pattern, use can be made of identically arranged connecting elements or of connecting elements arranged in a mirror image way.

What is claimed is:

1. A device for connecting together flat elements that are lying in a plane with at least one edge of a first flat element of the flat elements adjacent at least one edge of each of second and third flat elements of the flat elements, the device being connected to the first flat element and comprising at least two hook-shaped organs, a first hook-shaped organ of the at least two hook-shaped organs cooperating with a first contact on the second flat element and a second hook-shaped organ of the at least two hook-shaped organs cooperating with a second contact on the third flat element, each of the first and second hook-shaped organs being movable relative to the first flat element between a first position in which the flat elements are released from each other, and a second position in which the first and second hook-shaped organs engage the first and second contacts, wherein movements of the first and second hook-shaped organs from the first positions thereof to the second positions thereof cause the at least one edge of the first flat element to be pressed against the at least one edge of each of the second and third flat elements.

2. A device according to claim 1, wherein each of the at least two hook-shaped organs comprises an arm, the device further comprising a lever mounted to the first flat element, the lever being rotatably connected to each of the first and second hook-shaped organs and movable to cause the first and second hook-shaped organs to simultaneously move from the first positions thereof to the second positions thereof.

3. A device according to claim 2, wherein the lever is kinematically coupled with each arm of the first and second hook-shaped organs.

4. A device according to claim 3, wherein the arms of the first and second hook-shaped organs are each connected to the lever by floating pivots, and the lever is rotatably connected with the first flat element.

5. A device according to claim 4, wherein the lever comprises a control arm and a spring that biases the lever in a direction that causes the first and second hook-shaped organs to move to their second positions.

6. A device according to claim 5, wherein the spring maintains the first and second hook-shaped organs in the second positions thereof during shrinking and expanding of the flat elements.

7. A device according to claim 1, wherein each of the first and second hook-shaped organs comprises a flat part that engages an oblique edge on each of the first and second contacts, respectively.

8. A device according to claim 1, wherein the flat elements are floor elements of a floor system.

9. A floor system comprising at least first, second and third floor elements configured to be connected together while lying in a plane and while edges of the first floor element are adjacent edges of the second and third floor elements, at least the first floor element comprising a connecting mechanism for connecting the second and third floor elements to the first floor element, at least the second and third floor elements comprising contacts, the connecting mechanism comprising a lever rotatably mounted to the first floor element, first and second arms rotatably coupled to the lever, and means for biasing the lever from a first position toward a second position, the first and second arms having means for engaging the contacts of the second and third floor elements when the lever is rotated from the first position to the second position so as to cause a first edge of the first floor element to be pressed against the edge of the second floor element and to cause a second edge of the first floor element to be pressed against the edge of the third floor element, the engaging means of the first and second arms disengaging the contacts of the second and third floor elements when the level is rotated from the second position to the first position so as to release the first and second edges of the first floor element from the edges of the second and third floor elements.

* * * * *